US008926239B2

(12) United States Patent
Liang

(10) Patent No.: US 8,926,239 B2
(45) Date of Patent: Jan. 6, 2015

(54) METHOD OF FORMING PISTON PIN HOLES AND BORING SYSTEM THEREFOR

(71) Applicant: Federal-Mogul Corporation, Southfield, MI (US)

(72) Inventor: Jiancheng Liang, Novi, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/963,525

(22) Filed: Aug. 9, 2013

(65) Prior Publication Data

US 2013/0322978 A1  Dec. 5, 2013

Related U.S. Application Data

(62) Division of application No. 12/490,616, filed on Jun. 24, 2009, now Pat. No. 8,506,215.

(51) Int. Cl.
| B23C 3/16 | (2006.01) |
| B23C 3/00 | (2006.01) |
| B23C 3/02 | (2006.01) |
| B24B 5/18 | (2006.01) |
| B24B 41/02 | (2006.01) |
| B24B 41/06 | (2012.01) |

(52) U.S. Cl.
CPC ... *B23C 3/00* (2013.01); *B23C 3/16* (2013.01); *B23C 3/02* (2013.01); *B24B 5/185* (2013.01); *B24B 41/02* (2013.01); *B24B 41/06* (2013.01); *B23B 2215/245* (2013.01)
USPC ........... 409/132; 409/200; 409/226; 409/228; 451/49

(58) Field of Classification Search
USPC ......... 409/132, 138, 139, 140, 163, 164, 165, 409/167, 199, 200, 226, 228, 235, 131, 227, 409/229; 451/5, 27, 49, 51, 52
See application file for complete search history.

(56) References Cited

U.S. PATENT DOCUMENTS

| 1,462,742 | A | * | 7/1923 | Davis et al. ...................... 408/79 |
| 2,275,291 | A | * | 3/1942 | Bannow ........................ 409/216 |
| 2,901,946 | A | * | 9/1959 | Grabes .......................... 409/171 |
| 3,332,321 | A | * | 7/1967 | Jacobsen ....................... 409/160 |
| 3,516,328 | A | * | 6/1970 | Klabunde et al. ............. 409/231 |
| 3,610,097 | A | * | 10/1971 | Ollearo ......................... 409/185 |
| 4,057,893 | A | | 11/1977 | Smith et al. |

(Continued)

FOREIGN PATENT DOCUMENTS

| DE | 4120640 A1 | 12/1992 |
| DE | 10137437 A1 | 2/2003 |

(Continued)

*Primary Examiner* — Daniel Howell
*Assistant Examiner* — Michael Vitale
(74) *Attorney, Agent, or Firm* — Robert L. Stearns; Dickinson Wright, PLLC

(57) ABSTRACT

A piston pin hole boring system and method of forming pin holes therewith includes fixing a piston to a fixture supported by a slide member. Then, rotating a cutting member about a first axis and moving the slide member with the fixture thereon toward the cutting member along the first axis and bringing the piston into cutting contact with the cutting member. Further, moving the fixture along second and third axes, each extending transversely to the first axis and machining the desired pin hole contours in the piston with the cutting member.

6 Claims, 1 Drawing Sheet

(56) References Cited

U.S. PATENT DOCUMENTS

| | | |
|---|---|---|
| 4,124,010 A | 11/1978 | Fiedler |
| 4,189,932 A | 2/1980 | Fielder |
| 4,250,775 A | 2/1981 | Jerue et al. |
| RE32,211 E | 7/1986 | Jerue et al. |
| 4,612,833 A | 9/1986 | Slee |
| 4,639,653 A * | 1/1987 | Anderson et al. ............. 318/599 |
| 4,739,684 A | 4/1988 | Brown et al. |
| 4,787,127 A * | 11/1988 | Beall ............................. 29/26 A |
| 4,847,964 A | 7/1989 | Adams et al. |
| 6,019,554 A * | 2/2000 | Hong ........................... 409/132 |
| 6,631,771 B2 * | 10/2003 | Hamamura et al. ............ 175/24 |
| 6,760,961 B2 | 7/2004 | Upadhya |
| 7,152,567 B2 | 12/2006 | Anderson et al. |
| 2003/0047046 A1 * | 3/2003 | Havskog ........................... 83/48 |
| 2006/0219066 A1 | 10/2006 | Nicholl et al. |

FOREIGN PATENT DOCUMENTS

| | | |
|---|---|---|
| EP | 0265586 A1 | 4/1988 |
| JP | S59214545 A | 12/1984 |
| JP | 11000803 A | 1/2011 |
| KR | 100730783 B1 | 6/2007 |

\* cited by examiner

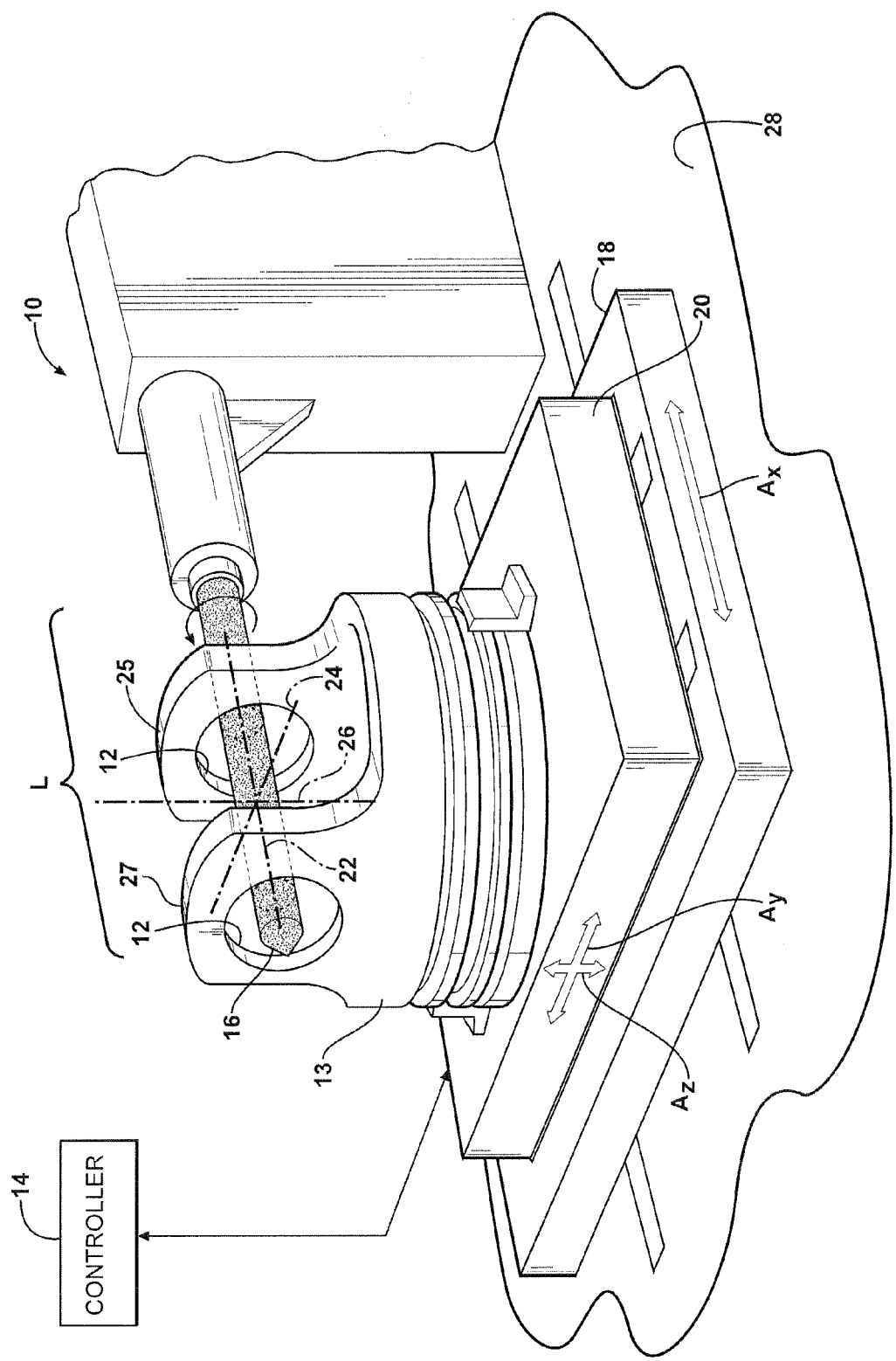

METHOD OF FORMING PISTON PIN HOLES AND BORING SYSTEM THEREFOR

This divisional application claims priority to U.S. application Ser. No. 12/490,616, filed Jun. 24, 2009, and is incorporated herein by reference.

BACKGROUND OF THE INVENTION

1. Technical Field

This invention relates generally to pistons, and more particularly to methods of forming pin holes in the pistons and boring systems therefor.

2. Related Art

Pistons have diametrically opposite pin holes configured for receipt of a wrist pin. The wrist pin is couple to a connecting rod to provide a transfer rotation motion of a crankshaft to reciprocal linear motion of the piston with a cylinder bore. The wrist pin can be configured for relative movement within the pin holes and/or with a bore of the connecting rod, as desired. Regardless, it is desirable to minimize frictional wear between the wrist pin and the pin holes and/or connecting rod bore. Accordingly, precise formation of the respective bores is critical to provide the assembly with a long and useful life. Commonly, the pin bores of the piston are formed by holding the piston in a fixed position while moving a cutting tool linearly through pin bosses of the piston. Typically, the pin holes are formed in separate operations at separate times, or they are formed at the same time through the use of separate cutting tools arranged on opposite sides of the piston. The cutting tool is configured to rotate and to move linearly along an axis transverse to a central longitudinal axis of the piston.

SUMMARY OF THE INVENTION

A piston pin hole boring system in accordance with one aspect of the invention includes a cutting member rotateable about a first axis and a slide member spaced from the cutting member along the first axis. The slide member is moveable toward and away from the cutting member along the first axis. Further, a fixture is supported by the slide member and is configured to receive a piston in fixed relation thereto. The fixture is moveable along a second axis extending transversely to the first axis and along a third axis different from the second axis, with the third axis extending transversely to the first axis.

In accordance with another aspect of the invention, a method of forming pin holes in a piston is provided. The method includes fixing the piston to a fixture. Then, rotating a cutting member about a first axis and moving the fixture along the first axis and bringing the piston into cutting contact with the cutting member. Further, moving the fixture along a second axis extending transversely to the first axis and along a third axis different from the second axis, the third axis extending transversely to the first axis.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

FIG. 1 is a perspective view of a piston pin hole boring system constructed in accordance with one presently preferred aspect of the invention.

DETAILED DESCRIPTION OF PRESENTLY PREFERRED EMBODIMENTS

Referring in more detail to the drawings, FIG. 1 illustrates a piston pin hole boring system 10 constructed in accordance with one presently preferred embodiment. The system 10 is operable to form piston pin holes 12 of any peripheral profile in a piston 13 for a vehicle internal combustion engine (not shown), whether circular or non-circular. The desired profile can be precisely formed under controlled feedback via a control system 14. The system 10 includes a cutting member 16, a slide member 18, and a fixture 20. The cutting member 16 is rotateable about a first axis 22, while the slide member 18 is moveable toward and away from the cutting member 16 along the first axis 22, as indicated by arrow Ax. The fixture 20 is supported by the slide member 18 and is moveable relative to the slide member along a second axis 24 that extends transversely or substantially transversely to the first axis 22, as indicated by arrow Ay, and also a third axis 26 that extends transversely or substantially transversely to the first axis 22, as indicated by arrow Az, and preferably transversely or substantially transversely to the second axis 24. The fixture 20 is configured to receive the piston 13 in fixed relation thereto, and thus, the piston 13 is moveable conjointly with the fixture 20 and also the slide member 18. Accordingly, the piston 13 is moveable relative to the cutting member 16 along the first, second and third axes 22, 24, 26, thereby allowing the pin holes 12 to be formed of any suitable peripheral geometry, as desired.

The cutting member 16 can be provided as a cutting tool having any suitable configuration of cutting teeth or grinding surface. The cutting member 16 can be used to form a single one of the pin holes 12 or a pair of the pin holes 12 in laterally spaced pin bosses 25, 27 in a single operation. As such, a pair of diametrically opposite and/or laterally spaced pin holes 12 can be formed in a single operation. Accordingly, the cutting member 16 is preferably provided having a length sufficient to extend through both the laterally spaced pin bosses 25, 27. The cutting member 16, although being rotateable about the first axis 22, can be maintained in a fixed position along the first axis 22 during the pin hole forming process.

The slide member 18 is spaced from the cutting member 16 along the first axis 22. The slide member 18 is supported by a base 28 and is configured to move relative to the base 28 along a substantially straight, linear path toward and away from the cutting member 16 along the first axis 22 to initiate and complete the pin hole cutting process. The piston 13 and the fixture 20 can remain fixed relative to the slide member 18 as it advances along the first axis 22 into initial cutting engagement with the cutting member 22. The slide member 18 is moved sufficiently along the first axis 22 to bring at least one or both laterally spaced pin bosses 25, 27 into cutting contact with the cutting member 16. Accordingly, one or both of the pin holes 12 can be formed in a single cutting operation by the single cutting member 16. As such, upon being moved to the desired cutting position, the cutting member 16 extends through one or both of the pin bosses 25, 27.

With the slide member 18 advanced to the desired position along the first axis 22 and with one or both the piston pin bosses 25, 27 having been brought into cutting engagement with the cutting member 16, fixture 20, with the piston 13 carried thereon, is moved along the second and third axes 24, 26 either simultaneously and/or separately. While the piston 13 is being translated conjointly with the fixture 20, the slide member 18 can be maintained in a stationary position. Further, while moving the fixture 20 along the second and third axes 24, 26, the cutting member 16 continues rotating at a desired rpm, which can be varied as desired, in centered, coaxial relation about the first axis 22. Accordingly, as the fixture 20 moves along the second and third axes 24, 26, which extend transversely to the first axis 22, one portion of the cutting member 16 is brought into cutting contact with the piston 13 while at the same time another portion of the cutting member 16 remains out of cutting contact with the piston 13. As the piston 13 moves conjointly with the fixture 20 along the second and third axes 24, 26, the portions of the cutting member 16 being brought into and moving out of cutting contact with the piston 13 continually varies.

While moving the fixture 20 and the piston 13 attached thereto along the second and/or third axes 24, 26, the precise control of machining can be attained via the control system 14. As the fixture 20 moves along the second and/or third axes 24, 26, continual monitoring of the closed loop feedback via the linear motor control system 14 can be performed to ensure the precise geometric contour of the pin holes 12 is being machined.

Accordingly, the innovative system 10 is useful in forming pin holes 12 via an innovative pin hole forming method. The method includes fixing the piston 13 to the fixture 20; rotating the cutting member 16 about the first axis 22, wherein the cutting member is provided having an outer diameter smaller than the desired pin hole diameter, and moving the fixture 20 along the first axis 22 and bringing the piston 13 into cutting contact with the cutting member 16. While moving the fixture 20 along the first axis 22, the method contemplates fixing the cutting member 16 against translational movement along the first axis 22. Then, after positioning the piston 13 in a desired, substantially fixed axial relation with the cutting member 16, wherein the cutting member 16 is either fully extended through one or both pin bosses 25, 27, the method continues by moving the fixture 20 along the second axis 24 extending transversely to the first axis 22 and along the third axis 26 extending transversely to the first axis 22, either simultaneously and/or separately. While moving the fixture 20 along the second and third axes 24, 26, the method includes moving one portion of the cutting member 16 into cutting contact with the piston while at the same time maintaining another portion of the cutting member 16 out of cutting contact with the piston. Further, the method contemplates controlling the movement of fixture 20 along the second and third axes 24, 26 in response to controlled feedback from the closed loop control system 14.

The method further includes supporting the fixture 20 on the slide member 18 and configuring the fixture 20 to move conjointly with the slide member 18 along the first axis 22 toward and away from the cutting member 16. Further, the method includes configuring the fixture 20 to move under controlled movement along the second and third axes 24, 26 relative to the slide member 18 and cutting member 16. Accordingly, the slide member 18 can remain stationary while the fixture 20 is moves along the second and/or third axes 24, 26, and the cutting member 26 can remain fixed, other than rotating about the axis 22. It should be recognized that the piston 13 remains fixed to the fixture 20 and thus, move conjointly therewith.

The method further includes bringing the cutting member 16 into cutting contact with laterally spaced pin bosses of the piston 13 while moving the fixture 20 along the first axis 22. As such, one or both of the pin holes 12 can be formed in a single machining operation. Of course, it should be recognized that the method also contemplates forming one pin hole 12 in one of the pin bosses and then, rotating the piston 13 about its longitudinal central axis and forming the other pin hole 12 in the opposite pin boss, if desired.

Obviously, many modifications and variations of the present invention are possible in light of the above teachings. It is, therefore, to be understood that within the scope of the appended claims, the invention may be practiced otherwise than as specifically described.

What is claimed is:

1. A method of forming pin holes in a piston, comprising:
preparing a fixture which is supported on a slide member that is configured to move the fixture in a first horizontal direction and wherein the fixture has a flat top surface;
fixing a piston body having a generally flat combustion surface to the fixture with the combustion surface facing the flat top surface of the fixture;
rotating a cutting member about a first axis which extends parallel to the first horizontal direction;
moving the fixture with the slide member in the first horizontal direction to bring the piston body into cutting contact with the rotating cutting member; and
moving the fixture with the piston fixed thereto in a second horizontal direction which extends horizontally and perpendicularly to the first horizontal direction and also moving the fixture with the piston fixed thereto in a vertical direction which extends perpendicularly to the first and second horizontal directions to machine pin holes in the piston body.

2. The method of claim 1 further including bringing the cutting member into cutting contact with laterally spaced pin bosses in the piston body during said step of moving the fixture in the first horizontal direction to machine the pin holes into the pin bosses of the piston body.

3. The method of claim 1 further including fixing the cutting member against movement in the first horizontal direction.

4. The method of claim 1 further including moving the fixture in the first and second horizontal directions in response to feedback from a closed loop control system.

5. The method of claim 1 wherein the cutting member has an outer diameter that is smaller than the desired pin hole diameter.

6. The method of claim 1 further including moving one portion of the cutting member into cutting contact with the piston body while at the same time maintaining another portion of the cutting member out of cutting contact with the piston body.

* * * * *